United States Patent [19]

Foshee et al.

[11] 4,428,570
[45] Jan. 31, 1984

[54] TOOL-LOADABLE BIASING SPRING

[75] Inventors: William R. Foshee, Indianapolis; Kevin L. Carey, Pendleton, both of Ind.

[73] Assignee: Best Lock Corporation, Indianapolis, Ind.

[21] Appl. No.: 326,483

[22] Filed: Dec. 2, 1981

[51] Int. Cl.³ ............................ F16F 1/18; E05B 3/04
[52] U.S. Cl. .................................. 267/164; 267/159; 267/163; 292/353; 70/224
[58] Field of Search ............... 267/164, 158, 159, 163; 292/352, 353, 359; 70/224

[56] References Cited

U.S. PATENT DOCUMENTS 2,998,273  8/1961  Unetic ............................... 292/359
4,342,478  8/1982  Foshee .............................. 292/352

Primary Examiner—Bruce H. Stoner, Jr.
Assistant Examiner—Robert J. Oberleitner

Attorney, Agent, or Firm—Barnes & Thornburg

[57] ABSTRACT

A tool-loadable biasing spring for a knob retainer plate securing a doorknob on its knob sleeve. The plate is slidable transversely in the sleeve and has a central opening. The biasing spring has a bight with a hook for engagement behind the linear forward border of the opening and with an axial offset for transmitting thrust to such border. Spring legs extend unrestrained across the face of the plate into camming relation with forwardly diverging inner faces of the sleeve, so as to generate forward bias on the spring. The legs have axial offsets with out-turned fingers to lock behind the plate. For loading, the spring is held in resiliently contracted condition across the end of a holder tool, and the tool is inserted into the end of the sleeve until both the bight offset and leg offsets and fingers pass simultaneously through the retainer plate opening. The spring is then released for self-movement into interlocked relation with the plate.

16 Claims, 12 Drawing Figures

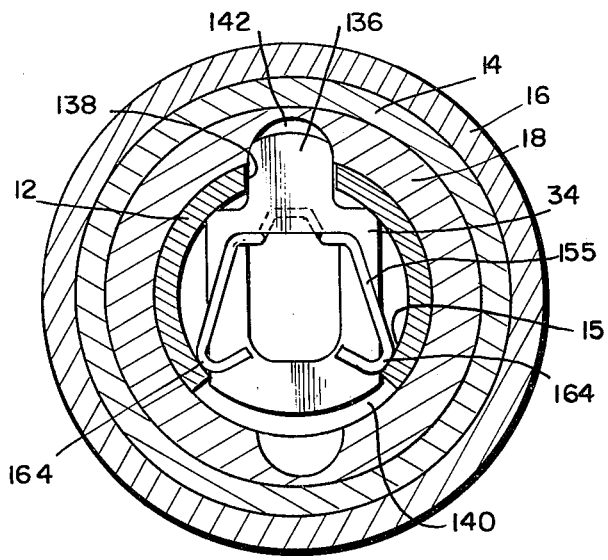
FIG. 10
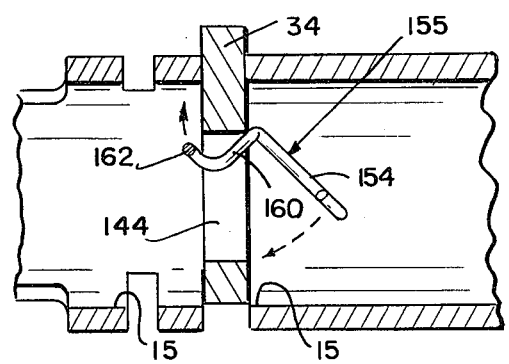
FIG. 12
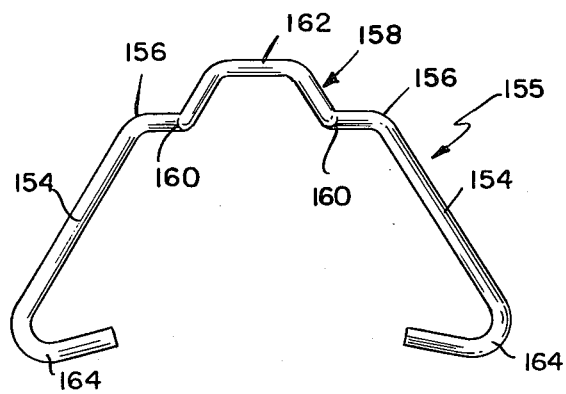
FIG. 11
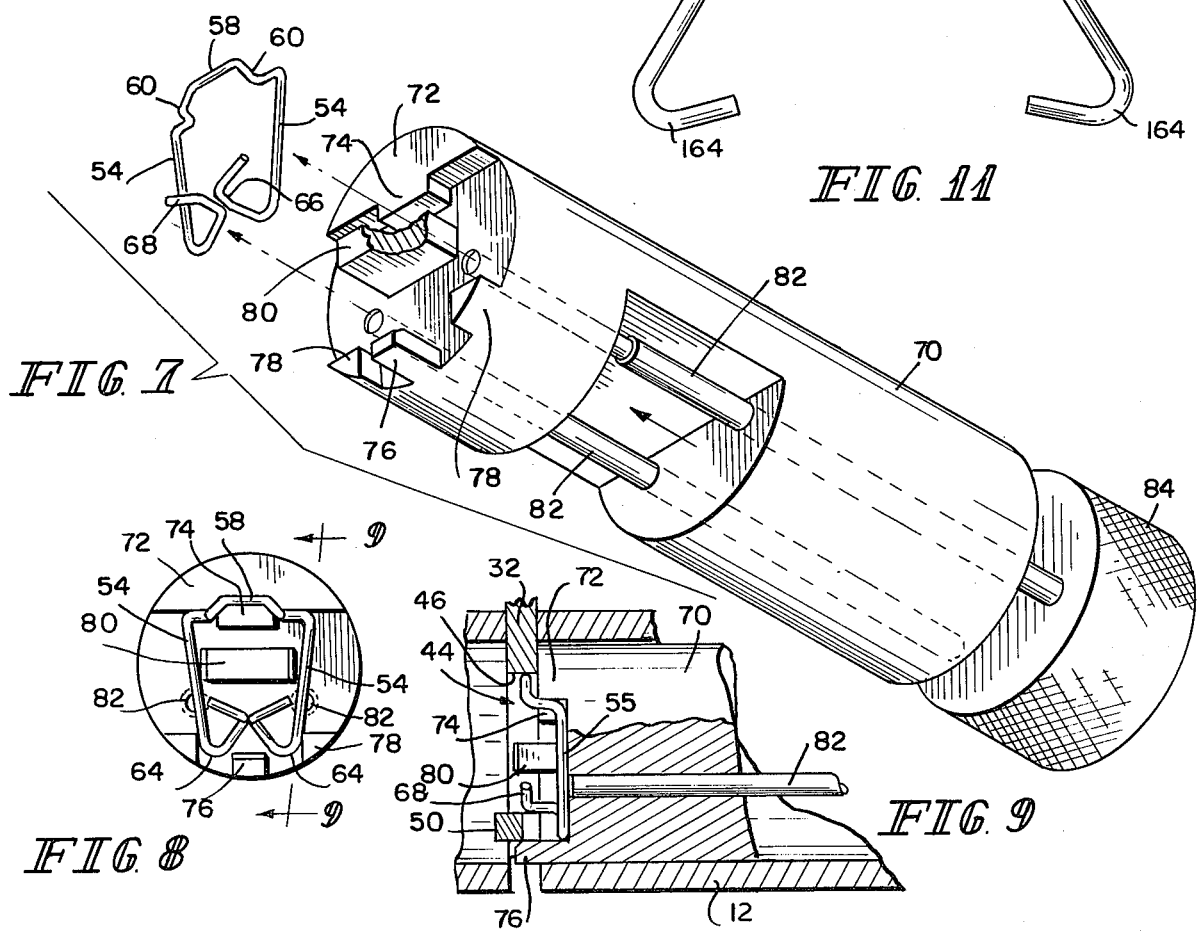
FIG. 7
FIG. 8
FIG. 9

TOOL-LOADABLE BIASING SPRING

This invention relates to the shape and interaction of a biasing spring in relation to a doorknob keeper or driver or other plate-like member slidably mounted transversely in a knob sleeve or other tubular member and serving to bias the member in a sliding direction, such interaction adapting the spring for tool-loaded assembly; and to a loading tool therefor.

U.S. Pat. No. 4,342,478, granted Aug. 3, 1982, to William R. Foshee, one of the present inventors, discloses a knob retainer mounted for transverse movement in a knob sleeve and biased in the direction of such movement by a generally U-shaped spring having a bight adjacent one side of the sleeve engaged about an inward-extending tongue on the retainer plate and having side legs extending generally chordally in splayed relation across the tubular member. The ends of the legs engage forwardly diverging inner surfaces at the opposite side of the sleeve in a camming relation and the legs are stressed to exert force laterally against such surfaces and thereby produce forward biasing force at the bight of the spring. A similar spring having a bight engaged about an inward extending tongue is also shown as biasing a torque-releasable driver plate for the knob. While the springs there disclosed provide a desirable biasing arrangement for the plate-like knob retainer and driver, the springs are difficult to assemble, especially in the case of the knob-retainer spring which is interlocked with the knob retainer plate. In assembly, the knob-retainer plate is first mounted in the knob sleeve, and it is then necessary to insert the spring through a deep length of the sleeve with the spring in a forward-tilted position so as to first engage its bight over the inward extending tongue, and then necessary to tilt the spring about such engagement while simultaneously holding the legs of the spring in a retracted position to carry their locking fingers through the plane of the retaining plate. Such assembly is difficult and slow, especially within the constriction of working deep within the end of the knob sleeve.

The present invention overcomes this assembly problem, and provides a spring and cooperating plate which permit the spring to be placed in a loading condition in a transverse plane parallel to its final position, as in a suitable loading fixture, then moved without tilting and by simple translatory movement normal to its plane and axially of the sleeve into an assembly position relative to the plate, and then released from the fixture into the desired operative biasing relation with the plate. Also, the invention provides a modified and simpler form of plate and spring, which eliminates the inward-extending tongue on the plate and forms the bight of the spring to perform the same function, which is advantageous for manufacture and facilitates assembly.

In accordance with the invention, a doorknob retainer or plate-like member is mounted for movement transversely of a knob sleeve or like tubular member and provided with border portions adjacent or preferably surrounding a central opening in the plate, with such border portions exposed axially within the tubular member and including a forward thrust-receiving border (forward in the direction in which the plate is to be biased) and adjacent side borders. The plate is biased by a generally U-shaped spring in a manner similar to that of the Foshee application. The spring has a bight formed with an offset extending through the opening in the plate and engaged in thrust-transmitting relation with such forward border, and the bight may include means such as a hook at its end for interlocking the bight to the plate. The spring also has side legs which extend generally chordally in splayed relation across the tubular member and have reverse bends at their ends which form cam nose portions for camming engagement with forwardly diverging inner surfaces at the opposite side of the tubular member.

The legs are desirably coplanar and at least partly overlie the side borders of the plate. They are preferably connected to the bight through shoulders which extend outward from the bight in the plane of the legs and into overlying relation with the side borders so that the shoulders and legs are located in a common plane parallel with and close to the side face of the plate. In the operating position of the spring, its legs are stressed inward so as to cause their cam nose portions to exert force laterally outward in opposite directions against the forwardly diverging surfaces and thereby to produce a forward-biasing force on the spring, urging the spring against the forward border of the plate and biasing the plate as a whole in the forward direction, as in the said Foshee application.

In further accordance with the present invention, the legs of the spring have means at their ends for interengagement with the plate, and the spring is resiliently bendable to carry its legs inward from their operative position to a "loading condition" in which the spring can be assembled to the plate by simple translatory movement normal to its plane. This permits the spring to be mounted in loading condition at the end of a suitable loading fixture and then inserted into the end of the knob sleeve or tubular member in a transverse position and moved, without tilting and by simple translatory movement normal to its plane and axially of the knob sleeve or tubular member, into an assembly position adjacent to the plate and slightly retracted from its operative position relative to the plate. For such interengagement with the plate, the reverse bends which form the cam nose portions at the ends of the legs are connected to axial offsets which extend through the plane of the plate and which carry outward-bent retaining fingers to engage behind the plate.

The plate and spring are so shaped that with the spring in its loading condition, translatory movement will carry both the bight offset and the leg offsets and outward-bent retaining fingers through the plane of the plate, as through the opening defined by the borders to an "assembly position" relative to the plate. When the spring is then released from its loading condition in that position, its legs will spring outward from each other to carry the nose portions into camming engagement with the diverging surfaces of the knob sleeve or other tubular member, and thereby cam the spring forward in its plane to its operative position. This will cause the bight offset to be engaged with the forward border of the plate and the retaining fingers to be interlocked behind the side borders of the plate. The relationship is such that the interlocked condition is maintained during normal movement of the plate from its operative position to a plate-retracted position. The spring and plate are thus so shaped that the spring has four conditions or positions, namely, (1) a loading condition in which it can be held in a fixture and moved by translatory movement axially of the knob sleeve to an assembly position relative to the plate, (2) such assembly position from which it can be released and will move by its own force into interlocked relation with the plate, (3) an operative position in which it is interlocked with the plate and will have its cam nose portions in camming relation with the diverging surfaces of the knob sleeve or other tubular member so as to be biased forward in its plane in biasing engagement with the plate and to bias such plate forward to its operative position, and (4) a retracted position to which it will be moved by rearward thrust on the plate so as to cause the spring nose portions to ride down along the diverging surfaces of the sleeve or other tubular member and thereby permit the plate to be retracted. Such retraction of a knob retainer plate will release the knob and allow it to be removed from the knob sleeve.

In further accordance with the present invention, the thrust-receiving forward border of the slidable plate carries no inward-projecting tongue as in the said Foshee application. Instead, the bight of the spring is formed with a forward-bent hook to engage behind a straight edge on the forward border of the plate. Such use of a hook on the bight of the spring is novel and advantageous both in a spring having interlocking means at the ends of its legs and also in a spring without such interlocking means which is held in place by external means, such as by an adjacent element of the lock mechanism.

In still further accordance with the invention, a spring-inserting tool adapted to be inserted axially into the end of a knob sleeve or similar tubular member is provided with means to hold a knob retainer spring in collapsed loading condition, in position to be guided by such tool into assembly relation with a knob retainer plate or the like, and then by actuation of the tool to be released from such assembly position for self-movement into operating position relative to such plate.

The accompanying drawings illustrate the invention, and show preferred embodiments exemplifying the best mode of carrying out the invention as presently perceived. In such drawings:

FIG. 1 is a longitudinal section showing a cylindrical lock mechanism in which a knob is retained on a knob sleeve by a knob retainer biased by a spring in accordance with the present invention, and in which the knob is drivingly connected to the knob sleeve by a driver plate biased to operative position by a spring including an outward-bent hook on its bight in accordance with the present invention;

FIG. 7 is an exploded view showing the spring in exploded relation with a spring-inserting tool;

FIG. 8 is an end view of the spring-inserting tool with a spring in loading condition mounted in such tool;

FIG. 9 is an axial section view taken on the line 9—9 of FIG. 1, showing the position of the spring and loading tool in relation to the knob retainer plate, with the spring in position to be released from the tool by thrust on the release pins of such tool;

FIG. 10 is a sectional view taken on the line 10—10 of FIG. 1, showing a torque-releasable knob driver biased to driving engagement with the knob; and FIG. 11 is a diagrammatic view illustrating a method of assembling the spring of FIG. 10 with the knob driver plate.

FIG. 12 is a sectional view showing the assembly of the biasing spring with the driver plate and knob sleeve.

Figure 1:
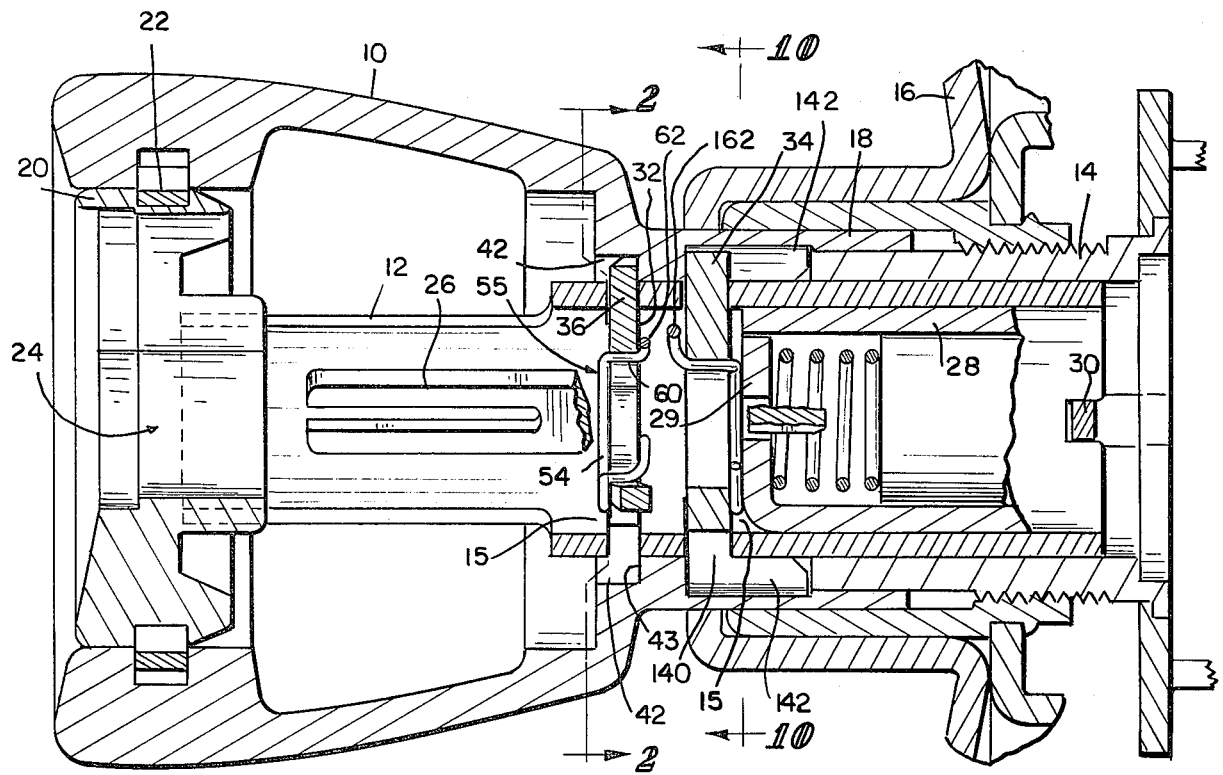

The lock mechanism shown in FIG. 1 comprises a knob 10 carried on a knob sleeve 12 mounted in a hub 14 at one side of a cylinder lock chassis and rotatable in the usual manner to retract the bolt of such lock. A trim ring or rose 16 is adjustably mounted on the hub 14 and extends outward to surround the neck 18 of the knob. The knob is hollow, and its outer end is closed by a face plate 20 which is rotatable in the knob but axially fixed therein by a buried retaining ring 22. The face plate contains an opening 24 of figure-8 cross section for the reception of a key-controlled lock core which is operative to rotate a throw member 26. Such throw member has its inner end engaged in a key-actuated roll-back cam sleeve 28 which is operative to retract the lock bolt when the knob sleeve 12 is locked against rotation by a locking lug 30 in known manner. The neck 18 of the knob has an inner cylindrical surface slidably engaged over a corresponding cylindrical surface of the knob sleeve 12, and the knob is held against removal from the sleeve by a knob retainer plate 32, and is held against rotation on the knob sleeve by a drive plate 34.

Figures 2, 3, 4:
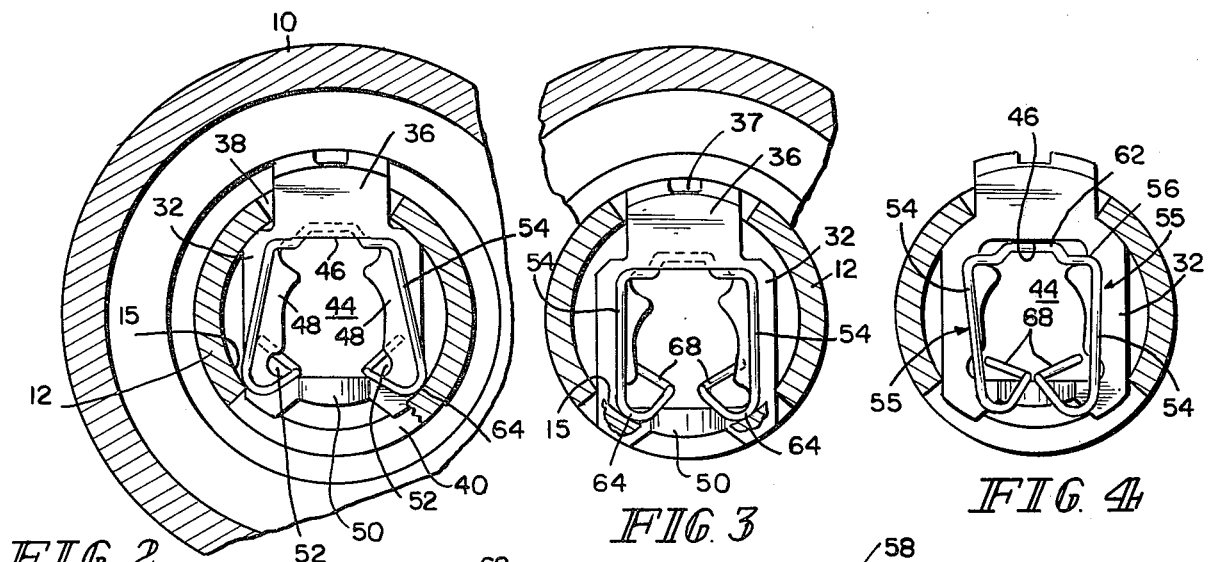
FIG. 2 is an axial section on the line 2—2 of FIG. 1, showing the knob retainer in normal retaining position and the biasing spring in its operating position.
FIG. 3 is a section like FIG. 2, but showing the knob retainer and spring in retainer-retracted positions.
FIG. 4 is a similar view, showing the spring in loading position relative to the knob retainer.

As shown in FIG. 2, the retainer plate 32 is a generally rectangular plate, with rounded upper corners and a central upward-projecting lug 36. It is mounted for sliding movement in a plane normal to the axis of the knob sleeve 12 by means of a slot 38 through which the lug 36 projects, and an opposite wider slot 40 in which the lower end of the rectangular plate 32 is slidable. The upper rounded corners of the plate 32 engage the inside surface of the knob sleeve 12 to limit movement of the plate in a forward direction, that is in a direction to project the lug 36 from the knob sleeve. The lug 36 extends into a rabbet groove 42 at the base of the knob and overlies the axially presented, circumferentially continuous surface 43 of that groove, so as to prevent axial removal of the knob 10 from the knob sleeve. The retainer plate is formed with a central opening 44 defined by border portions which are axially exposed within the knob sleeve 12. These include a forward border portion 46 having a straight chordal thrust-receiving edge, side border portions 48, and a rear border portion 50. The rear border portion is desirably offset from the plane of the retainer plate 32, after the plate has been assembled with the knob sleeve 12, so as to prevent removal of the plate from such assembly and limit its retraction movement from the projected position shown in FIGS. 1 and 2. The opening 44 provides clearance for the throw member 26 by which the cylindrical lock is actuated from the key-controlled core in the knob. The retainer plate 32 is here shown with side borders 48 formed with inward-projecting peaks and concave inner edges, for a purpose not here involved, and the side borders may be formed with straight edges so as to make the opening 44 of generally rectangular configuration. In either case, the side border portions 48 are desirably formed at their rearward ends with side notches 52, for purposes of loading the biasing spring, as will be explained.

Figures 5, 6:
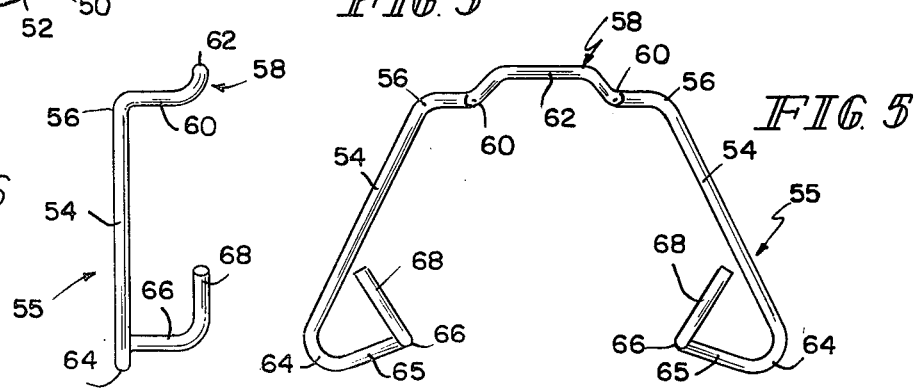
FIG. 5 is an elevational view of the spring shown in FIGS. 1-4, in its unstressed condition.
FIG. 6 is a side view of the spring shown in FIG. 5.

The retaining plate 32 is biased forwardly, in the direction of the projecting lug 36, so as to bias such lug to projected position, as shown in FIG. 2. The biasing spring is a generally U-shaped spring shown in unstressed and enlarged condition in FIGS. 5 and 6. It includes side legs 54 connected through shoulder portions 56 at their upper ends to a bight portion 58 which extends from the shoulders 56 rearward through an offset portion 60 and includes at the rear an outward-turned hook portion 62. Such hook portion 62 is adapted to engage behind the forward thrust-receiving border 46 when the spring is in operative position as shown in FIGS. 1 and 2 with its coplanar legs 54 and shoulders 56 lying against the front face of the retainer plate 32. The lower ends of the legs 54 of the spring 55 are bent through reverse turns to form cam nose portions 64, and the reverse bends are connected at their ends to rearward-bent offsets 66 which carry outward-bent fingers 68. As shown in FIGS. 1 and 2, when the retaining plate is in normal projected position, the cam nose portions 64 of the spring bear against forwardly diverging inner faces of the knob sleeve 12 along the edge of the wide slot 40, in a camming relation. In such operative position, the reverse bends 65 extend inward and upward to points at which the rearward offset 66 can extend through the opening 44 of the plate, inward from the side notches 52 and forward from the rear border 50, and the spring-retaining fingers 68 extend upward and outward into interlocking engagement behind the side borders 48 of the plate. The spring is thus interlocked with the plate so as to be retained in its operating position independently of other support.

In the operative position of the retaining plate 32 as shown in FIGS. 1 and 2, the legs 54 of the spring 55 extend generally chordally and in splayed relation across the knob sleeve, and are stressed inward so that their cam nose portions 64 exert outward thrust in opposite directions against the forwardly diverging inner surfaces of the knob sleeve 12 so as to be cammed thereby in a forward direction and hence to cam the spring 55 as a whole in a forward direction against the thrust-receiving edge 46 of the retainer plate and thus to bias the retainer plate as a whole in the forward direction.

For purposes of releasing the knob 10 from the knob sleeve 12, the retaining plate 32 and its lug 36 are retractable to the position shown in FIG. 3, where the lug 36 lies within the circumference of the knob sleeve 12 and the offset bottom border 50 of the plate approaches the inner surface of the knob sleeve at a diametrically opposite point so as to limit the retraction movement. As the retainer plate 32 is moved from the projected position shown in FIG. 2 to the fully retracted position shown in FIG. 3, the cam nose portions 64 of the spring legs 54 ride downward along the forwardly diverging inner surfaces of the knob sleeve, and permit the retraction in opposition to the biasing force of the spring. In the knob assembly shown in FIG. 1, it is contemplated that the retainer plate 32 will be retracted by means of a tool inserted through the knob end opening 24 after removal of the key-controlled core. In the case of an inside knob, not containing such a key-controlled core, the knob may be provided with a small opening through its side wall, through which a wire-like tool may be inserted against a flat 37 formed on the end of the lug 36 to retract the retainer plate, as is conventional in the art. When the retainer plate 32 is in retracted position as shown in FIG. 3, the side legs are swung inward, as to a generally parallel position as shown in FIG. 3, but their movement is desirably insufficient to carry the locking fingers 68 past the inner edges of the borders 48 of the plate, and the spring remains interlocked with the plate in its fully retracted positions, and hence in all positions of its movement between projected and retracted positions.

For purposes of assembling the spring 55 with the plate 32, the spring is bent to a "loading condition" as shown in FIG. 4. The legs 54 are stressed inward toward each other sufficiently to position the rearward offsets 66 close to each other and position the locking fingers 68 to pass through the opening 44 and specifically through the side notches 52 at the rearward end of such opening 44. Also, the spring as a whole is positioned rearward from its operating relation to the retainer plate 32 sufficiently to align the hook 62 of the bight 58 with the opening 44 in the plate and in clearance relation with the forward border 46 defining that opening. In this loading condition as shown in FIG. 4, the spring can be moved by simple translatory movement normal to the plate 32 and to the plane of the spring legs 54, and axially of the knob sleeve 12, into an assembly position in which its coplanar legs 54 and shoulders 56 lie in a plane close to the front face of the retainer plate 32, as shown in FIG. 9. When released from such assembly position, the spring will move itself into operative position, as further explained below.

Conveniently, the assembly of the spring 55 to the plate 32 through the end of the pre-assembled retainer plate 32 in a knob sleeve 12 is done by means of a tool which holds the spring 55 in its loading condition. Such a tool is shown in FIGS. 7-9, and comprises a generally cylindrical body 70 adapted to fit loosely through the open end of the knob sleeve 12. Its forward end carries a land 72 with an inward-extending boss 74 adapted to be engaged in the bight portion 58 of the spring, with the offsets 60 lying against the side edges of such boss. At the opposite side, the forward end of the tool body 70 carries a narrow forward projection 76 adapted to extend through the clearance space between the rearward border 50 of the retainer plate and the adjacent cylindrical inner wall of the knob sleeve 12, as shown in FIG. 9, to ensure that the retainer plate is in proper projected position to receive the spring. Spaced from the sides of such projection 76 are two projections 78 adapted to receive between them the cam nose portions 64 at the lower ends of the spring legs, as shown in FIG. 8. The forward end of the tool body also preferably carries a central post 80 which, in the loading position of the tool, extends between the legs 54 of the spring and through the central opening 44 of the retainer plate, so as to block any attempt to assemble the spring with a retainer plate not adapted to receive it.

In order to deliver the loaded spring from the tool into assembly with the retainer plate, a pair of thrust pins 82 are slidably mounted in longitudinal holes in the tool body 70, in position to push forward the legs 54 of the loaded spring, as shown in FIG. 8. The two pins 82 are connected to a handle 84 at the rear of the tool, and may be biased to retracted position by springs, not shown.

The spring 55 has three distinct conditions or positions. In FIG. 8, the spring 55 is shown in its "loading position," held between the projections 72 and 78 at the front end of the loading tool, in which condition it can be carried by such tool to an "assembly" position shown in FIGS. 4 and 9. In that position, the hook 62 of the spring bight and the locking fingers 68 at the ends of its legs 54 are both in clearance relation with the borders of the hole 44 in the retainer plate, and such hook and fingers can be moved at least partly through the plate to a position in which the tool land 72 and projections 78 abut the front face of the plate, as shown in FIG. 9. From that assembly position and loading condition, the spring is delivered into assembled relation with the retaining plate by moving the handle 84 and thrust pins 82 forward to push the spring off the tool and out of engagement with the projections 72 and 78 on the tool. As the spring leaves the tool, it moves in translatory movement normal to itself to carry its legs 54 and shoulders 56 against the front face of the retaining plate, and its legs are released so that they spring outward from their loading condition to their operating position as shown in FIG. 2. As their cam nose portions 64 engage and slide upward along the forwardly diverging inner surfaces of the knob sleeve 12, they cam the spring as a whole forward to carry its bight offsets 60 against the edge of the forward border 46 of the retaining plate and engage its hook 62 behind such edge. The outward movement of the legs 54 also carries the locking fingers 68 upward and outward to their locking positions as shown in FIG. 2. The spring is then in its "operative position" where it biases the retaining plate 32 forward and the lug 36 outward. When the lug is retracted by forcing retaining plate 32 rearward, the cam nose portion 64 of the spring rides downward along the inner surfaces 15 of the knob sleeve and the legs 54 are resiliently stressed inward to a "plate-retracted position" as shown in FIG. 3.

The knob driver plate 34 shown in FIGS. 1 and 10 is of a type which provides a torque-releasable connection between the knob and the knob sleeve, to protect against forceful actuation of the cylinder lock by the application of high torque to the knob. The plate 34 is a generally rectangular plate with a lug 136 projecting forwardly from it. The plate is mounted transversely of the knob sleeve, for diametric movement therein. To this end, the 136 is slidably received in a notch 138 at one side of the knob sleeve, and the opposite end of the plate slidably engages in a wider slot 140 in the opposite side of the knob sleeve. The outer end of the lug 136 is rounded, and engages in an axial groove 142, of rounded cross section, as shown in FIG. 10. Conveniently, there are two such grooves 142 in the neck 18, and each opens axially toward the end of such neck so as to permit the neck to be engaged and disengaged from the driver by axial movement. The driver plate 34 is biased into engagement with the groove 142 by a spring 155 with a predetermined limited force. If excess torque is applied to the knob 10, the lug 136 will be cammed inward by the sloping interengaging faces of the lug and the groove 142, so as to release the driving connection and permit the knob to turn without turning the knob sleeve 12.

The biasing spring 155 is similar to the retainer plate biasing spring 55, except that it does not include means for locking the free ends of the spring legs to the rearward portions of the plate. As shown in FIG. 11, the spring 155 is a generally U-shaped spring having side legs 154 joined by shoulders 156 to a bight portion 158 which includes axially extending offsets 160 of a length to extend through the retainer plate, joined at their ends to an outward-bent portion forming a hook 162, which may be longer than the hook 62 of the spring 55. The free ends of the legs are reversely bent to form cam nose portions 164 adapted to make camming engagement with forward-diverging inner surfaces 15 of the knob sleeve 12 as in the case of the retainer plate spring 55.

The driver plate 34 has a central opening 144 both to provide for clearance of the throw member 26 and for purposes of engagement of the spring 155 with the plate. The spring 155 may be assembled with the driver plate and the knob sleeve 12 as illustrated in FIG. 12. The driver plate 34 is first inserted through the slot 140 to its normal operating position as shown in which the lug 136 projects beyond the outer surface of the knob sleeve and the rounded forward corners of the plate 34 engage against the inner surface of that sleeve. The spring 155 is then inserted in a tilted position longitudinally through the inner end of the knob sleeve 12 to the position shown in FIG. 12 in which its bight portion extends through the opening 144 of the plate with the hook 162 in position to engage behind the surface of the plate. The two legs 154 of the spring are then pushed forward and swung toward the plate as indicated by the arrow in FIG. 12. In the tilted position shown in FIG. 12, the ends of the legs 154 are in engagement with the side walls of the knob sleeve at substantially diametrically opposite points. As those legs are swung toward the drive plate 34, they ride along the curved inner surface of that sleeve and are stressed inward from their unstressed position shown in FIG. 11 to their operative position shown in FIG. 10. The cam nose portions 164 then lie in camming relation with forwardly diverging inner surfaces of the knob sleeve and exert force thereagainst in outward opposite directions so as to cam the spring 155 forward to exert forwarding biasing force from the spring to the drive plate 34 and bias the plate to its normal operating position as shown. In the lock mechanism shown, no means is necessary to interlock the ends of the legs with the driver plate. Instead, the legs and their shoulders and cam nose portions lie confined in a plane between the driver plate 34 and the end wall 29 of the key-actuated cam sleeve 28.

Neither the driver plate 34 nor the knob retainer plate 36 includes, or requires, an inward-projecting tongue at the thrust-receiving forward edge of the central opening in the plate, as was shown in co-pending application Ser. No. 163,472, now U.S. Pat. No. 4,342,478 for engagement with the bight loop of the biasing spring to hold that spring in place. Instead, in the present invention, the spring 55 is held in place by the hook 62, and the spring 155 is held in place by the hook 162. Such hooks are relatively easy to form, and eliminate the necessity of forming the more difficult inward-projecting tongues on the plates. Further, the use of the hooks facilitates assembly of the lock mechanism, especially in the case of the knob retainer plate and its spring 55, since the hook 62 of that spring can be made of a size and shape to make it feasible to load the spring by translatory movement with a loading tool, as described. Correspondingly, by making the spring 155 without a long hook 162 as shown, such spring 155 can be loaded with a tool as shown in FIGS. 7-9.

What is claimed is:

1. Spring-biased mechanism for securing a knob or the like with respect to a knob sleeve adapted to be assembled by translatory movement of a biasing spring, comprising a tubular member, a plate mounted for movement transversely of the tubular member and adapted to be biased in a forward direction of such movement, said plate having border portions adjacent an opening in the plate, exposed axially within the tubular member, and including a forward thrust-receiving border, a generally U-shaped spring having a bight engaged in thrust-transmitting relation with said forward border and side legs extending unrestrained chordally across the tubular member and having cam nose portions engaged in camming relation with forwardly diverging inner surfaces at the opposite side of the tubular member, the legs when in operative position being stressed to exert camming force laterally against such diverging surfaces and thereby to produce forward biasing force at the bight of the spring, wherein the improvement comprises the following additional features and relationships:

said plate border portions including side and rearward borders, said spring being resiliently bendable to a loading condition wherein it is movable by translatory movement normal to its plane into assembly relation with the plate, said spring bight including an offset and the plate and spring being so shaped that by translatory movement of the spring in loading condition such bight offset will pass through the plate opening to a position extending through the plane of the plate and from which it is then movable into interlocked relation with the plate by forward movement of the spring parallel to the plate, said spring legs having inward reverse bends forming said cam nose portions for engagement with said diverging surfaces, having leg offsets inward of such bends to extend through the plane of the plate, and having retaining fingers bent outward from said leg offsets to engage behind the plate, the plate and spring being so shaped that, with the spring in loading condition, the same translatory movement which passes the bight offset through the plate opening will carry the leg offsets and outward bent retaining fingers of the spring through the plane of the plate to assembly relation with the plate, where they will be movable into interlocked relation with side borders of the plate, the spring, on release from its loading condition, being operative to move its legs outward from each other to carry said cam nose portions into camming engagement with said diverging surfaces of the tubular member and thereby to cam the spring forward in its plane so as to carry the bight offset into thrust-transmitting relation with the plate and interlock the retaining fingers with side borders of the plate.

2. Spring-biased mechanism as in claim 1 in which said plate opening is a generally rectangular opening having clearance notches in its side borders adjacent its rearward border in clearance alignment with the ends of said retaining fingers when the spring is in loading condition, the arrangement being such that spring movement on release of the spring from loading condition causes such ends to move outward and forward from alignment with such clearance notches into interlocked relation behind the side borders of the plate.

3. Spring-biased mechanism as in claim 1 wherein the plate is biased forward by the spring to an operative position and is slidably movable rearward against the bias of the spring to a retracted position, the rearward movement causing the cam nose portions of the spring legs to ride downward along said forward diverging surface and thereby causing the spring legs to swing toward each other to a plate-retracted position, the spring in such plate-retracted position being held forward against the forward border of the plate, with the retaining fingers of the spring located forward of their loading position and interlocked behind the side borders of the plate.

4. Spring-biased mechanism as in claim 2 wherein the plate is biased forward by the spring to an operative position and is slidably movable rearward against the bias of the spring to a retracted position, the rearward movement causing the cam nose portions of the spring legs to ride downward along said forward diverging surface and thereby causing the spring legs to swing toward each other to a plate-retracted position, the spring in such plate-retracted position being held forward against the forward border of the plate, with the retaining fingers of the spring located forward of said clearance notches and interlocked behind the side borders of the plate.

5. Spring-biased mechanism as in any one of claims 1–4 in which the spring has shoulder portions adjacent the bight and extending laterally in the plane of the legs to overlie the borders of the plate.

6. Spring-biased mechanism as in any of claims 1–4 in which the spring legs are so shaped and spaced as to at least partially overlie the front face of the plate for locating the legs in a parallel plane adjacent the plate.

7. Spring-biased mechanism as in any of claims 1–4 in which said spring bight includes an offset extending through the plane of the plate and engageable against said forward border to transmit forward thrust thereto, and including a hook portion extending forward from said offset for engagement behind the forward border to interlock the forward portion of the spring to the plate when the spring is moved from a loading assembly position to a plate-biasing position.

8. Spring-biased mechanism, comprising
a tubular member,
a plate mounted for movement transversely of the tubular member and having an opening therein defining a forward thrust-receiving edge,
a biasing spring having a bight portion extending axially through said plate opening in thrust-transmitting relation with said edge, and including an outwardly bent hook engaged behind the plate,
said spring having a pair of legs joined to said bight and extending unrestricted along the front face of the plate, across the tubular member, into camming relation with forwardly diverging surfaces at the opposite side of the tubular member,
said legs when in operative position being extended to exert force laterally against said diverging surfaces and thereby to urge said bight into interlocked relation with said forward thrust-receiving edge and to exert forward-biasing force therethrough on the plate.

9. Spring-biased mechanism as in claim 8 in which said bight portion is connected to said legs by shoulder portions which extend laterally outward into overlying relation with the front face of the plate so as to locate the base of the bight portion in a plane at the front side of the plate.

10. Spring-biased mechanism as in claim 8 or 9 with the addition that said plate includes side and rear border portions defining said plate opening, said legs having inward reverse bends forming cam nose portions for providing said camming engagement with said diverging surfaces, said reverse bends being joined to offsets extending through the plate opening and carrying outward and upward bent fingers at their ends extending behind said side border portions to interlock the free ends of the legs to the plate.

11. Spring-biased mechanism as in claim 10 in which said spring is resiliently bendable to a loading condition and the spring and opening are so shaped that the hooked bight and the locking fingers can be simultaneously passed through the plane of the plate by translatory movement of the spring in a direction normal to the plate.

12. Spring-biased mechanism as in claim 11 in which said plate has side and rear borders defining said opening, said side borders having outward notches adjacent the rear border and forming clearance spaces for passing the locking fingers through the plane of the plate when the spring is in loading condition, the spring when in operative relation with the plate being moved forward relative to the plate to locate said locking fingers out of alignment with said notches.

13. Spring-biased mechanism as in claim 8 in which said side legs lie substantially entirely in a common plane adjacent the face of the plate and means positioned adjacent said plane to confine the legs between itself and the plate.

14. A tool-loadable biasing spring for a knob retainer plate or the like mounted for transverse sliding movement intermediate the length of a knob sleeve or like tubular member, the plate having an opening adjacent one side of the tubular member for thrust-receiving engagement by the spring, said spring comprising a bight portion including an offset normal to the plane of the plate for extending through the plate opening and movable thereagainst in thrust-transmitting relation therewith, a pair of legs connected to said bight and formed and positioned to extend across the tubular member into camming engagement with forwardly diverging inner surfaces of the tubular member and to exert outward opposite thrust against such surfaces so as to cam the spring forward against said thrust-receiving border of the plate, said spring being resiliently movable to a loading condition with its legs in a plane transverse to the tubular member and parallel with the plate, in which condition said legs are turned inward to pass freely through the bight of the tubular member and said bight offset projects forward from the transverse plane of the legs in alignment with the plate opening and in clearance relation with said thrust-receiving border.

15. A tool-loadable spring as in claim 14 in which said legs have offsets adjacent their ends which project forward from the plane of the legs and carry outward bent loading fingers at their ends, said offsets and fingers, in the loading condition of the spring, being disposed in alignment with the plate opening for passage therethrough simultaneously with said bight offset.

16. Spring-biased mechanism as in claim 1 in which the spring legs are so shaped and spaced as to at least partially overlie the front face of the plate for locating the legs in a parallel plane adjacent the plate, and in which said spring bight includes an offset extending through the plane of the plate and engageable against said forward border to transmit forward thrust thereto, and including a hook portion extending forward from said offset for engagement behind the forward border to interlock the forward portion of the spring to the plate when the spring is moved from a loading assembly position to a plate-biasing position.

* * * * *